United States Patent [19]
Menzel

[11] Patent Number: 6,000,287
[45] Date of Patent: Dec. 14, 1999

[54] CAPACITOR CENTER OF AREA SENSITIVITY IN ANGULAR MOTION MICRO-ELECTROMECHANICAL SYSTEMS

[75] Inventor: Christoph P. Menzel, Simsbury, Conn.

[73] Assignee: Ford Motor Company, Dearborn, Mich.

[21] Appl. No.: 09/143,255

[22] Filed: Aug. 28, 1998

[51] Int. Cl.⁶ .......................... G01P 15/125; G01P 21/00
[52] U.S. Cl. ........................................ 73/514.32; 73/1.38
[58] Field of Search ........................... 73/514.32, 514.36, 73/514.16, 514.21, 1.37, 1.38; 361/280, 283.1, 292

[56] References Cited

U.S. PATENT DOCUMENTS

| | | |
|---|---|---|
| 4,488,864 | 12/1984 | Borrelli et al. . |
| 4,736,629 | 4/1988 | Cole . |
| 4,930,042 | 5/1990 | Wiegand et al. ..................... 73/514.18 |
| 5,220,835 | 6/1993 | Stephan . |
| 5,404,749 | 4/1995 | Spangler . |
| 5,488,864 | 2/1996 | Stephan ............................... 73/514.32 |
| 5,587,518 | 12/1996 | Stevenson et al. . |
| 5,646,348 | 7/1997 | Greiff et al. ......................... 73/514.16 |

*Primary Examiner*—Hezron Williams
*Assistant Examiner*—Helen C. Kwok
*Attorney, Agent, or Firm*—Donald A. Wilkinson; Roger L. May

[57] ABSTRACT

A method is provided that may be used to design a family of capacitive microaccelerometers with different members of the family having different sensitivities to acceleration without having to make a radical design change to the basic construction. The microaccelerometer is a capacitively sensed angular motion micro-electromechanical system. The microaccelerometer includes a stationary plate electrode and a movable plate electrode substantially parallel with the stationary plate electrode. The movable plate electrode rotates through a dielectric fluid about an axis of rotation parallel to the stationary plate electrode in response to acceleration. The method includes determining the desired sensitivity and changing the stationary plate center of area relative to the movable plate so as to obtain the desired sensitivity.

9 Claims, 2 Drawing Sheets

CAPACITOR CENTER OF AREA SENSITIVITY IN ANGULAR MOTION MICRO-ELECTROMECHANICAL SYSTEMS

TECHNICAL FIELD

The present invention relates to designing acceleration sensitivity for micro-electromechanical systems such as variable capacitance microaccelerometers.

BACKGROUND ART

Micro-electromechanical systems (MEMS), such as microaccelerometers, are used in a wide variety of applications. One such application is in vehicle airbag systems which deploy one or more airbags to protect vehicle passengers based on accelerations placed on the vehicle. Variable capacitance accelerometers have one or more electrodes on a stationary substrate and one or more electrodes on a mass constructed to move relative to the substrate when the mass is accelerated. An electrode on the mass and a corresponding electrode on the substrate form a capacitor, the capacitance value of which varies as the mass moves closer to or further from the substrate in response to acceleration. The sensitivity of variable capacitance microaccelerometers can be expressed as the relative change in capacitance between the sensor at rest and the sensor experiencing a given acceleration.

Accordingly, there is a need to design the sensitivity of capacitive microaccelerometers. For a given construction, it is often desirable to maximize the sensitivity. Also, it is desirable to design a family of capacitive microaccelerometers with different members of the family having different sensitivities without having to make radical design changes to the basic construction of family members.

DISCLOSURE OF INVENTION

It is an object of the present invention to design the sensitivity to acceleration of variable capacitance microaccelerometers.

Another object of the present invention is to provide a method for designing the maximum sensitivity for a particular construction of a variable capacitance microaccelerometer.

Still another object of the present invention is to allow members of a family of microaccelerometers to be designed, each member having a different sensitivity to acceleration, without significant change in the basic construction between members of the family.

Yet another object of the present invention is to provide an MEMS with a designed sensitivity that can be varied without significant change to the basic construction.

In carrying out the above objects and other objects and features of the present invention, a method for designing a capacitively sensed angular motion MEMS with a desired sensitivity is provided. The sensor includes a stationary electrode and a movable electrode separated by a dielectric fluid. The stationary electrode and the movable electrode are substantially parallel. The movable electrode rotates through the dielectric fluid about an axis of rotation parallel to the stationary electrode in response to the sensed parameter. The stationary electrode has a center of area relative to the movable electrode. The method includes determining the desired sensitivity and changing the stationary electrode center of area relative to the movable plate so as to obtain the desired sensitivity.

In a preferred embodiment, the stationary electrode and the movable electrode are rectangular. Each electrode has sides defining a width parallel to the axis of rotation. Changing the stationary electrode center of area relative to the movable electrode includes changing the stationary electrode length.

In another embodiment, changing the stationary electrode center of area relative to the movable electrode includes changing the stationary electrode position relative to the movable electrode.

An MEMS is also provided. The MEMS includes a substrate and a rigid support member attached to the substrate. A deflection member attached to the support member deflects relative to the support member. The deflection member has a bottom surface substantially parallel with the substrate top surface. A first electrode is located on the bottom surface of the deflection member. A second electrode is located on the top surface of the substrate. The first electrode and the second electrode form a capacitor with the capacitance based on the deflection of the deflection member. The second electrode center of area is positioned relative to the first electrode to achieve a desired sensitivity of change in capacitance for a given deflection.

A micromachined accelerometer is also described. The micromachined accelerometer includes a substrate and a movable plate, the movable plate substantially parallel to and above the substrate. The movable plate includes an aperture, a pedestal position within the aperture and rigidly attached to the substrate, and at least one torsional member connecting the pedestal to at least one edge of the aperture. The torsional members allow the movable plate to rotate relative to the substrate about a flexure axis in the presence of an acceleration normal to the substrate. The micromachined accelerometer also includes a first electrode on the movable plate and the second electrode on the substrate located generally below the first electrode. The first electrode and the second electrode form a first capacitor with capacitance varying with rotation of the movable plate. The second electrode center of area is positioned relative to the first electrode to achieve a desired first capacitor sensitivity. The micromachined accelerometer further includes a third electrode on the movable plate formed at a position opposite of the flexure axis from the first electrode and a fourth electrode on the substrate located generally below the third electrode. The third electrode and the fourth electrode form a second capacitor with capacitance varying with rotation of the movable plate. The fourth electrode center of area is positioned relative to the third electrode to achieve a desired second capacitor sensitivity.

In an embodiment of the present invention, the micromachined accelerometer has the desired first capacitor sensitivity equal to the desired second capacitor sensitivity. In another embodiment, the sensitivities are not equal.

In still another embodiment, the movable plate is shaped substantially in the form of a trident with the first electrode on a handle of the trident and the third electrode on a center prong of the trident.

In yet another embodiment, the movable plate is operable to function as the first electrode and the third electrode.

BEST MODES FOR CARRYING OUT THE INVENTION

Figure 1:
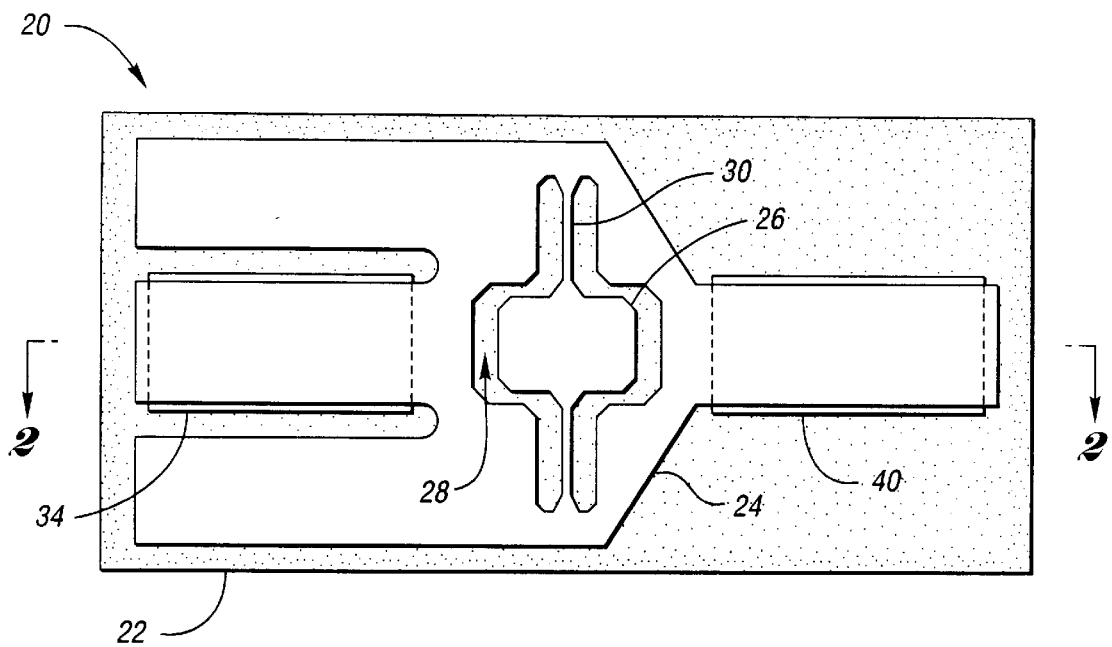
FIG. 1 is a top view of a capacitive microaccelerometer that may benefit from the present invention.
Figure 2:
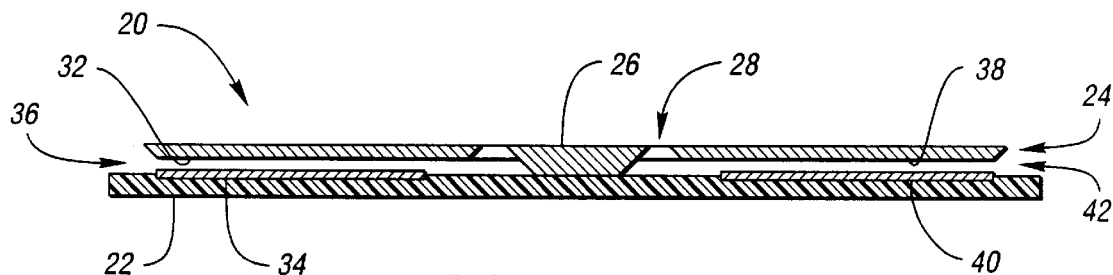
FIG. 2 is a side view of the capacitive microaccelerometer shown in FIG. 1.

Referring now to FIG. 1, a top view, and FIG. 2, a sectional view, a capacitive microaccelerometer is shown. Micro-electromechanical system (MEMS) 20 includes substrate 22 and movable plate 24 suspended above substrate 22. Pedestal 26 is attached to substrate 22, and forms a rigid support member for the remainder of movable plate 24. An aperture, shown generally by 28, forms an opening in movable plate 24 around most of pedestal 26. Torsional member 30 connects pedestal 26 with an edge of aperture 28 on movable plate 24.

Movable plate 24 generally has the shape of a three-pronged trident with the handle to the right and the prongs to the left as seen in FIG. 1. Since the density of plate 24 is uniform, the portion of movable plate 24 to the left of torsional members 30 has a mass different than the portion to the right of torsional members 30. Acceleration in a direction normal to substrate 22 will cause movable plate 24 to rotate about a flexure axis defined by torsional members 30. This will cause one side of movable plate 24 to move closer to substrate 22 while the other side of movable plate 24 moves farther from substrate 22. First electrode 32 is located on the bottom of movable plate 24. Second electrode 34 is located on the top surface of substrate 22 generally below first electrode 32. First electrode 32 and second electrode 34 form a first variable capacitor 36. Likewise, third electrode 38 is located on the bottom of movable plate 24 opposite the flexure axis formed by torsional members 30. Fourth electrode 40 is located upon substrate 22 generally below third electrode 38 and opposite the flexural axis from second electrode 34. Third electrode 38 and fourth electrode 40 form second variable capacitor 42.

When system 20 experiences acceleration normal to substrate 22 and in a direction from substrate 22 to movable plate 24, first electrode 32 moves closer to second electrode 34 and the capacitance value of first variable capacitor 36 increases and, at the same time, third electrode 38 moves away from fourth electrode 40 and the capacitance value of second variable capacitor 42 decreases. Similarly, acceleration in the opposite direction causes a decrease in first variable capacitor 36 capacitance and an increase in second variable capacitor 42 capacitance.

Figure 3:
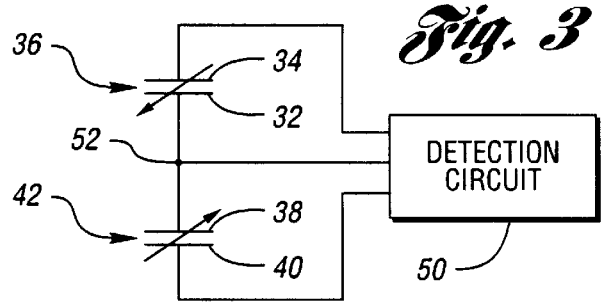
FIG. 3 is a schematic diagram showing the operation of a capacitive microaccelerometer.

Referring now to FIG. 3, a schematic diagram of a circuit for detecting acceleration of substrate 22 is shown. First capacitor 36 and second capacitor 42 are connected to detection circuit 50. Detection circuit 50 is operable to convert changes in capacitance from first capacitor 36 and second capacitor 42 into a signal indicative of acceleration. In a preferred embodiment, movable plate 24 is operable to function as both first electrode 32 and third electrode 38 as shown by the common connection at point 52.

System 20 may be constructed by means well known in the art of integrated circuit manufacturing and micromachining. Substrate 22 may be a Pyrex glass wafer. Movable plate 24 may be constructed from a wafer of single crystal silicon. The silicon can be etched to form the trident shape including aperture 28, pedestal 26 and torsion members 30. Metal may be deposited on substrate 22 and subsequently etched to form second electrode 34 and fourth electrode 40. Movable plate 24 may be attached to substrate 22 by an anodic bonding process. Detection circuit 50 may be incorporated on substrate 22. Alternatively, conductors on substrate 22, not shown for clarity, may be connected to electrodes 32, 34, 38, and 40 to provide connection to off-substrate detection circuit 50. A dielectric fluid, typically an inert gas, may be located between substrate 22 and movable plate 24 to improve the performance of first capacitor 36 and second capacitor 42 as well as to dampen the motion of movable plate 24.

Figure 4:
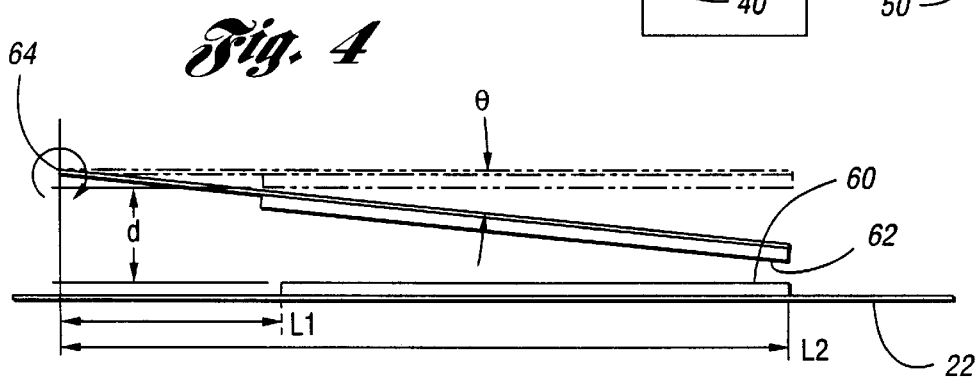
FIG. 4 is a side view of a conceptualized capacitive microaccelerometer used to describe the present invention.

Referring now to FIG. 4, a side view of a conceptualized MEMS capacitive microaccelerometer is shown. Stationary electrode 60 is located on substrate 22. Movable electrode 62 is connected so as to rotate about axis of rotation 64. Axis of rotation 64 is substantially paralleled to stationary electrode 60. Movable electrode 62 is substantially parallel with stationary electrode 60. When substrate 22 is accelerated in a direction perpendicular to stationary electrode 60, movable electrode 62 will rotate slightly by an angle θ. The angle θ is shown greatly exaggerated in FIG. 4. Stationary electrode 60 may be second electrode 34, fourth electrode 40, or the like. Movable electrode 62 may be first electrode 32, third electrode 38, or the like. Axis of rotation 64 may be the flexure axis formed by torsional members 30.

To simplify calculations, assume that stationary electrode 60 and movable electrode 62 have rectangular surface areas. Further, assume that stationary electrode 60 and movable electrode 62 have sides perpendicular to axis of rotation 64 defining a width. These assumptions are not required for the present invention, and are made to simplify the following calculations. Let the length of stationary electrode 60 be defined as the difference between two dimensions L2 and L1. L1 is defined as the distance from the normal projection of axis of rotation 64 onto substrate 22 to the start of stationary electrode 60. L2 is defined as the distance from the normal projection of axis of rotation 64 onto substrate 22 to the end of stationary electrode 60. The length of movable electrode 62 will determine acceptable bounds for L2 and L1. Let d be the distance between stationary electrode 60 and movable electrode 62 when θ is zero. If the gap, d, is small compared to planar dimensions of stationary electrode 60 and movable electrode 62, and the rotational angle, θ, is small, the capacitance, C, between stationary electrode 60 and movable electrode 62 can be given by Equation 1:

$$C = \epsilon W \int_{L1}^{L2} \frac{1}{d - l\tan\theta} dl = \frac{\epsilon W}{\theta} \times \ln\left[\frac{(d - L1 \times \theta)}{(d - L2 \times \theta)}\right] \quad (1)$$

where W is the width of stationary electrode 60 and movable electrode 62 and $\epsilon$ is the dielectric constant of a fluid between stationary electrode 60 and movable electrode 62.

The angle θ is related to normal acceleration, a, by Equation 2:

$$M_{tot} \times L_{cm} \times a = \kappa \times \theta \quad (2)$$

where $M_{tot}$ is the total mass of movable electrode 62, $L_{cm}$ is the location of the center of mass of movable electrode 62, and κ is the torsional spring constant about axis of rotation 64.

A general figure of merit, F, for the sensitivity of capacitive microaccelerometers is shown in Equation 3:

$$F = \frac{1}{C_{nom}} \frac{\delta C}{\delta a} \quad (3)$$

where $C_{nom}$ is the capacitance between stationary electrode 60 and movable electrode 62 when the system is not exposed to acceleration a.

The present invention uses the location of the center of area of stationary electrode 60 relative to axis of rotation 64 and, hence, relative to movable electrode 62, to change the sensitivity of system 20. The center of area is defined as the first moment of area as in Equation 4:

$$Center\ of\ Area_{\bar{r}} = \frac{1}{A} \int x dA \quad (4)$$

where the integration is performed over the area of the capacitor, x is the perpendicular distant from axis of rotation 64 to the differential area dA, and r is the directional long axis of rotation 64. The result is that, as the center of area moves away from rotational axis 64, the measured capacitive change per acceleration increases. Conversely, as the center of area moves closer to rotation axis 64, the measured capacitive change per acceleration decreases.

Conceptually, this relationship between center of area and sensitivity occurs because, under rotational motion, the change in separation distance from the nominal separation (θ=0) is greater at a point further from rotational axis 64. Hence, locating stationary electrode 60 further from rotational axis 64 leads, on average, to a more distinct change in separation and, thereby, to a larger change in capacitance.

Figure 5:
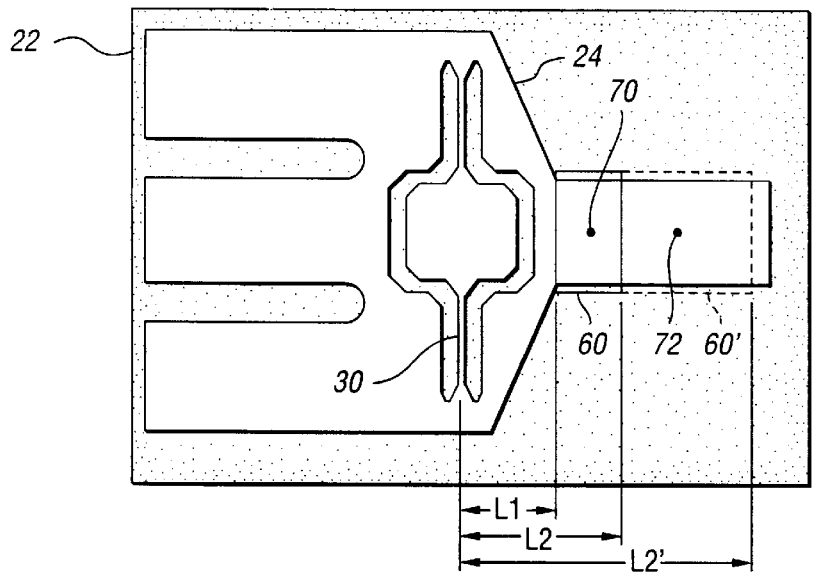
FIG. 5 is a top view of a capacitive microaccelerometer showing a first technique for changing the center of area of an electrode.

Referring now to FIG. 5, a first method for changing the center of area of a stationary electrode is shown. The operation of movable plate 24 relative to substrate 22 is described with regards to FIGS. 1 and 2 above. Stationary electrode 60 located upon substrate 22 has an initial length defined as the distance between L2 and L1 and has an initial center of area shown by point 70. Moving L2 to L2' changes the center of area to point 72. As can be seen from Equations 1 through 4, increasing L2 increases the capacitance, C, as well as the figure of merit, F.

Figure 6:
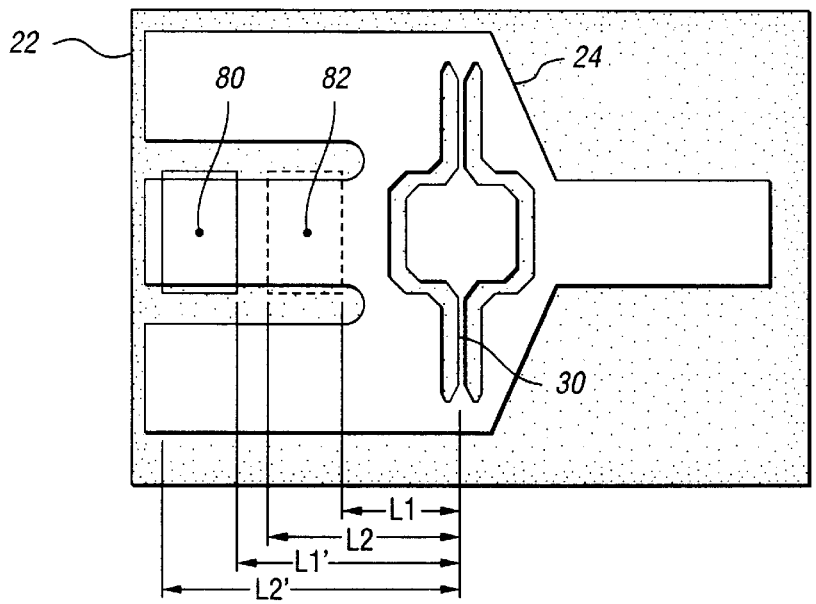
FIG. 6 is a top view of a capacitive microaccelerometer showing a second technique for changing the center of area of an electrode.

Referring now to FIG. 6, a second method for increasing the center of area of a stationary electrode is shown. In this method, the position of stationary electrode 60 is changed relative to movable electrode 62. The initial position of stationary electrode 60 is defined by the difference between L2 and L1 and results in an initial center of area indicated by point 80. Changing the position of stationary electrode 60 to L2' and L1' results in stationary electrode 60' with a center of area indicated by point 82. As can be seen in Equations 1 through 4, decreasing L1 and L2 by the same amount decreases capacitance C and figure of merit F.

Figure 7:
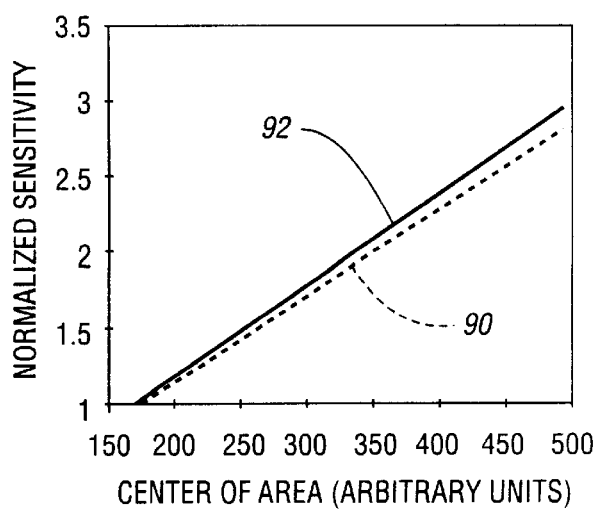
FIG. 7 is a graph showing simulated normalized sensitivity as a function of center of area.

Referring now to FIG. 7, graphs showing the effect on normalized sensitivity to changing the center of area are shown. The center of area is shown in arbitrary units. Plot 90 shows the effect of increasing L2 while keeping L1 the same. Plot 92 shows the effect of increasing L2 and L1 by the same amount. As can be seen by the graph, increasing the center of area produces a linear increase in the normalized sensitivity. Plots 90,92 were produced from a simulated MEMS 20.

Using graphs similar to those shown in FIG. 7, any desired sensitivity for a particular construction of movable plate 24 can be obtained up to the sensitivity produced when stationary electrode 60 is completely beneath all of movable electrode 62. This allows a family of sensors, each member having a different sensitivity, to be designed using the same basic sensor construction. In embodiments of the present invention, MEMS 20 may have first variable capacitor 36 with the same acceleration sensitivity as second variable capacitor 42 or may have first variable capacitor 36 with a different sensitivity than second variable capacitor 42.

While the best modes for carrying out the invention have been described in detail, other possibilities exist within the spirit and scope of the present invention. Those familiar with the art to which this invention relates will recognize various alternative designs and embodiments for practicing the invention as defined by the following claims.

What is claimed is:

1. A method for designing a capacitively sensed, angular motion micro-electromechanical sensor (MEMS) wherein the sensor comprises a stationary electrode and a movable electrode separated by a dielectric fluid, the stationary electrode and the movable electrode substantially parallel, the movable electrode operative to rotate through the dielectric fluid about an axis of rotation parallel to the stationary electrode in response to a sensed parameter, the stationary electrode having a center of area relative to the movable electrode, the method comprising:

determining a desired sensitivity; and changing the stationary electrode center of area relative to the movable electrode so as to obtain the desired sensitivity.

2. A method as in claim 1 wherein the stationary electrode and the movable electrode are rectangular, each electrode with sides defining a width, the width extending parallel to the axis of rotation, the stationary electrode further having sides defining a length normal to the width, changing the stationary electrode center of area relative to the movable electrode comprising chancing the stationary electrode length.

3. A method as in claim 1 wherein changing the stationary electrode center of area relative to the movable electrode comprises moving the stationary electrode relative to the movable electrode.

4. A micro-electromechanical system (MEMS) comprising:

a substrate having a top surface;

a rigid support member attached to the substrate;

a deflection member attached to the support member so as to deflect relative to the support member, the deflection member having a bottom surface substantially parallel with the substrate top surface;

a first electrode on the bottom surface of the deflection member; and a second electrode on the top surface of the substrate, the second electrode having an area with a center of area, the first electrode and the second electrode forming a capacitor with capacitance based on the deflection of the deflection member;

wherein the second electrode center of area is positioned relative to the first electrode to achieve a desired sensitivity of change in capacitance for a given deflection.

5. A micromachined accelerometer comprising:

a substrate;

a movable plate substantially parallel to and above the substrate comprising
        an aperture,
        a pedestal positioned within the aperture, the pedestal rigidly attached to the substrate, and at least one torsional member connecting the pedestal to at least one edge of the aperture, the at least one torsional member allowing the movable plate to rotate relative to the substrate about a flexure axis in the presence of an acceleration normal to the substrate;

a first electrode on the movable plate;

a second electrode on the substrate located generally below the first electrode, the second electrode having an area with a second electrode center of area, the first electrode and the second electrode forming a first capacitor with capacitance varying with rotation of the movable plate, wherein the second electrode center of area is positioned relative to the first electrode to achieve a desired first capacitor sensitivity, the desired first capacitor sensitivity expressed as change in capacitance of the first capacitor for a given acceleration normal to the substrate;

a third electrode on the movable plate formed at a position opposite of the flexure axis from the first electrode; and a fourth electrode on the substrate located generally below the third electrode and formed at a position opposite of the flexure axis from the second electrode, the fourth electrode having an area with a fourth electrode center of area, the third electrode and the fourth electrode forming a second capacitor with capacitance varying with rotation of the movable plate, wherein the fourth electrode center of area is positioned relative to the third electrode to achieve a desired second capacitor sensitivity, the desired second capacitor sensitivity expressed as change in capacitance of the second capacitor for a given acceleration normal to the substrate.

6. A micromachined accelerometer as in claim 5 wherein the desired first capacitor sensitivity is equal to the desired second capacitor sensitivity.

7. A micromachined accelerometer as in claim 5 wherein the desired first capacitor sensitivity is not equal to the desired second capacitor sensitivity.

8. A micromachined accelerometer as in claim 5 wherein the movable plate is shaped substantially in the form of a trident with the first electrode on a handle of the trident and the third electrode on a center prong of the trident.

9. A micromachined accelerometer as in claim 5 wherein the movable plate is operable to function as the first electrode and the third electrode.

* * * * *